United States Patent [19]

Marangoni

[11] Patent Number: 4,941,105
[45] Date of Patent: Jul. 10, 1990

[54] METHOD AND APPARATUS FOR MEASURING DYNAMIC BEARING FORCE

[75] Inventor: Roy D. Marangoni, Pittsburgh, Pa.
[73] Assignee: University of Pittsburgh, Pittsburgh, Pa.
[21] Appl. No.: 251,690
[22] Filed: Sep. 29, 1988
[51] Int. Cl.[5] .............................. G06F 15/20
[52] U.S. Cl. ...................... 364/506; 73/660
[58] Field of Search ............ 364/508, 507, 506; 73/866.5, 660, 659, 651, 649, 593

[56] References Cited

U.S. PATENT DOCUMENTS

| 2,426,089 | 8/1947 | Fitzgerald, Jr. | 73/660 |
| 3,686,956 | 8/1972 | Simpkin et al. | 73/660 |
| 4,027,539 | 6/1977 | Halloran | 73/465 |
| 4,464,935 | 8/1984 | McHugh | 73/660 |
| 4,635,210 | 1/1987 | Shiohata et al. | 364/508 |

FOREIGN PATENT DOCUMENTS 1298528  3/1987  U.S.S.R.  ............... 364/507

Primary Examiner—Parshotam S. Lall
Assistant Examiner—S. A. Melnick
Attorney, Agent, or Firm—Buchanan Ingersoll

[57] ABSTRACT

A support member extending outwardly from the surface of a bearing overlies a rotatable shaft supported by the bearing. The support member is spaced a preselected distance from the shaft, and a plurality of sensors for detecting displacement of the shaft extend from the support member toward the shaft. Each sensor is positioned on the support member a preselected distance from the surface of the bearing. A probe extends from each sensor to a fixed distance from the shaft. Control means are electrically connected to each sensor and receive signals proportional to the shaft dynamic displacement therefrom. In response to shaft displacement the sensors generate displacement signals which are converted by the control means to a readout representative of the dynamic force applied by the shaft to the bearing.

10 Claims, 1 Drawing Sheet

METHOD AND APPARATUS FOR MEASURING DYNAMIC BEARING FORCE

BACKGROUND OF THE INVENTION

1. Field of the Invention

This invention relates to apparatus for measuring the dynamic force exerted by a rotating shaft on a bearing and more particularly to a bearing force transducer system by which two bearing force and moment components can be simultaneously measured to provide a resultant measure of bearing force and moment exerted on a shaft without disrupting the operation of the rotating shaft.

2. Description of the Prior Art

In a conventional rotor or driven system a drive shaft coupled to a motor transmits a rotation to a member such as a rotor mounted on the shaft. Accordingly, the shaft is rotatably journalled in a frame by bearings. Conventionally, over a period of time of operation, the bearings may become worn and the shaft eccentrically supported by the bearing to the extent that static and dynamic loads are exerted on the shaft.

A number of solutions have been proposed to detect lateral movement of a shaft resulting in unbalance and eccentricity of the shaft rotating in the bearing. If this condition persists for a long period of time, fatigue and potential wear of the bearing can lead to improper operation of the machinery. It is known to use detectors to monitor the movement of a shaft mounted in bearings to obtain a measure of the wear on the shaft. By continually monitoring or detecting movement of the shaft, it is possible to measure the amplitude and frequency of the dynamic forces exerted on the bearing which will result in fatigue or wear on the machinery over a period of time.

Examples of devices for measuring the amplitude and frequency of dynamic force exerted on a rotating shaft journalled in a bearing are disclosed in U. S. Pat. Nos. 4,027,539 and 4,464,935. In each of these devices a sensor is mounted on the bearing. In U. S. Pat. No. 4,027,539 a load cell is mounted on the non-rotating portion of the bearing to sense the frequency and amplitude of movement of the shaft journalled in the bearing. The load cell extends into physical contact to sense the pressure generated by lateral movement of the shaft on the load cell within the bearing. With the embodiment disclosed in U. S. Pat. No. 4,464,935, a pair of detectors are supported by the bearing and protrude into the cavity containing the fluid formed by the bearing for receiving the shaft. In both of the above described embodiments, the load cells and sensors are located on two axes spaced at right angles to one another to provide a reading of the forces generated in X and Y axes.

It is also well known to utilize optical, magnet-inductive, and capacitive detectors for detecting movement of a shaft or rotor mounted in bearings. The magnetic detector consists of a magnetic component firmly fixed to the stator and is used to measure the air gap formed between a stator and a rotor. With the capacitive detector, a condensor is fixed to the stator and another is fixed to the rotor. With each of these devices as well as those described in the above-identified patents, the load cell or sensor upon detection of lateral movement generates an electrical signal which is transmitted to a control device which provide a readout of the total dynamic force exerted on the shaft at the point where the measurements are taken.

While it has been suggested by the prior art devices to monitor lateral displacement of a shaft supported in a bearing during operation of the associated machinery, the known devices require substantial modification to the machinery to accommodate support of the detector on the bearing structure so that the probe of the detector is in close contact with the shaft. Therefore, there is need for a system to measure dynamic displacement of a shaft supported in a bearing which does not contact the shaft or require the journal or bearing to be materially altered to support the detector. The detector must be capable of selective movement around the axis of the shaft to provide a plurality of readings at selected angles in order to generate a resultant measure of the shaft displacement.

SUMMARY OF THE INVENTION

In accordance with the present invention there is provided apparatus for measuring the dynamic force exerted by a rotating shaft on a bearing that includes a support member extending outwardly from the surface of the bearing in overlying relation with the shaft. The support member has a surface spaced a preselected distance from the shaft. A plurality of sensors detect lateral displacement of the shaft from the support member surface. Each of the sensors is located on the support member a preselected lateral distance from the surface of the bearing. A probe extends from each sensor to a fixed position from the shaft such that each probe is preferably spaced an identical distance from the shaft. Control means are electrically connected to each of the sensors and receives from each sensor an electrical signal proportional to the shaft dynamic displacement at the location of each sensor from the bearing. The control means upon actuation is operable to receive a displacement signal from each sensor and combine the displacement signals to generate a readout of the dynamic force applied by the shaft to the bearing.

Further in accordance with the present invention there is provided a bearing force transducer system that includes a rotary shaft. A bearing rotatably supports the shaft. Means is provided for supporting the bearing in a plane relative to the shaft. A first arm member extends outwardly from the plane of the bearing and is spaced a fixed distance from the surface of the shaft. A second support member extends outwardly from the plane of the bearing and is spaced a fixed distance from the surface of the shaft. The first and second support arms are angularly displaced with respect to the shaft. A plurality of displacement probes are mounted on each support arm and spaced one from another a selected distance from the plane of the bearing. The probes each have a sensor spaced a selected distance from the shaft where the distance between the sensor and the shaft is identical for each of the probes. Each of the sensors is operable to sense lateral displacement of the shaft and generate an electrical signal proportional to the shaft dynamic displacement. A controller receives the electrical signals from the probes at the location of each probe on the first and second support arms. A means is provided for electrically connecting each of the probes to the controller to combine the signals from the probes on the first and second support arms and generate from the controller a measurement of the total dynamic force exerted by the shaft on the bearing.

Additionally in accordance with the present invention there is provided a method for measuring the magnitude of the dynamic force exerted by a rotating member on a bearing that includes the steps of supporting relative to the shaft a plurality of detectors spaced from one another at preselected distances from the plane of the bearing. Each detector is actuated to generate a signal proportional to the displacement of the shaft sensed by the detector with respect to the location of each detector. The signals received at the location of each detector are converted to the measurement of the dynamic force exerted by the shaft on the bearing at the plane of the bearing at a preselected time interval.

Accordingly, the principal of the present invention is to provide a method and apparatus for detecting a dynamic displacement of a rotating shaft supported by a bearing in a manner that is efficiently supported and selectively movable relative to the shaft.

Another object of the present invention is to provide a transducer system that can generate a measurement of both the bearing force and bearing moment exerted on a shaft due to unbalance and eccentricity of the support of the shaft by the bearing.

Another object of the present invention is to provide a plurality of displacement probes that can be positioned at selected angular positions around the shaft without contacting the shaft or disrupting the machinery to periodically or constantly monitor the shaft for lateral displacement which could result in fatigue of the machinery.

These and other objects of the present invention will be more completely disclosed and described in the following specification, the accompanying drawings and the appended claims.

DESCRIPTION OF THE PREFERRED EMBODIMENTS

Figure 1:
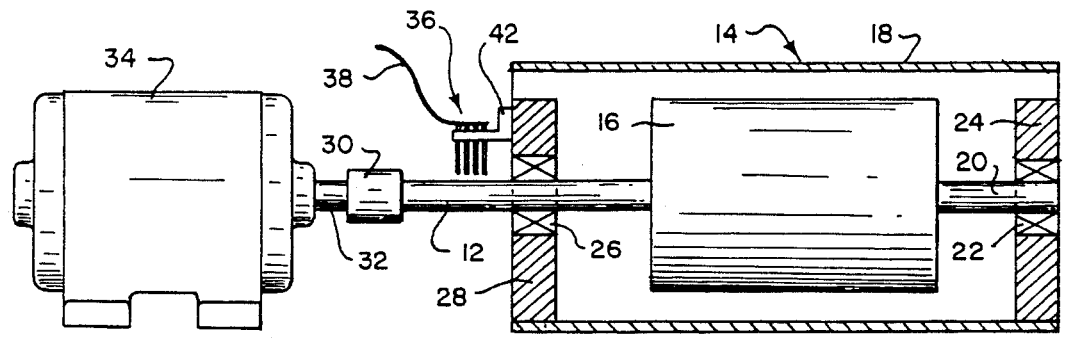
FIG. 1 is a schematic elevation view of a rotor system for measuring the resultant force generated by dynamic displacement of the shaft within the bearing.
Figure 2:
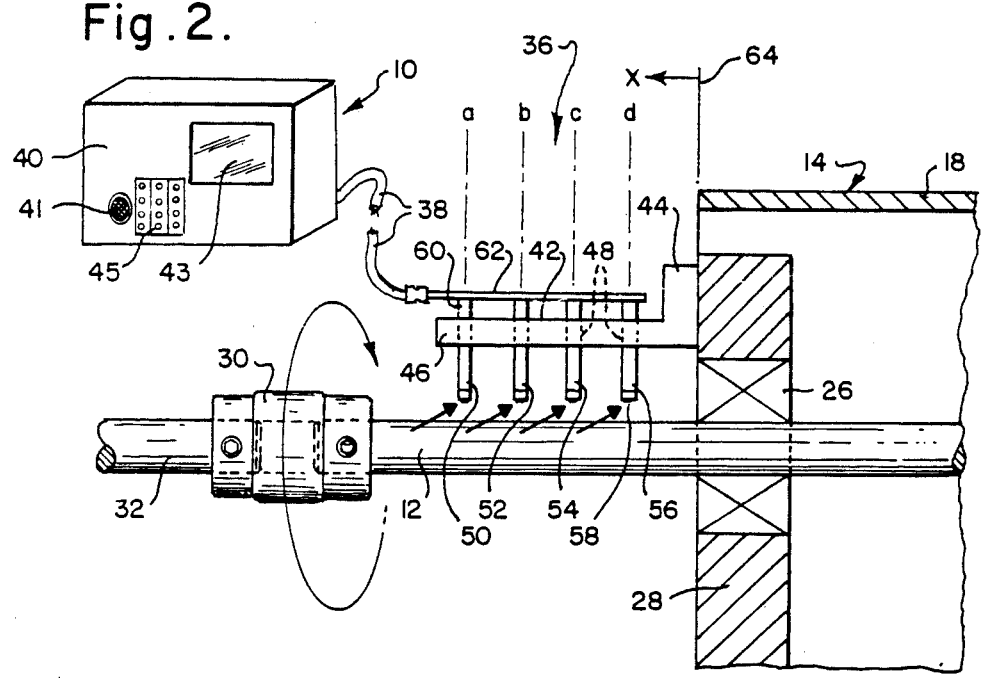
FIG. 2 is an enlarged schematic view of the rotor system shown in FIG. 1, illustrating a displacement probe for supporting a plurality of sensors in close adjacency to the rotating shaft.

Referring the the drawings and particularly FIGS. 1 and 2, there is illustrated a transducer system generally designated by the numeral 10 for measuring bearing force exerted on the shaft 12 resulting in lateral displacement of the shaft and dynamic bearing force and bearing moment. The shaft is part of a conventional driven or rotor system generally designated by the numeral 14 that includes a rotor 16 mounted for rotation with the shaft within a housing 18. The shaft 12 extends through the housing 18 and includes a first end portion 20 rotatably supported by a conventional bearing 22 mounted within a bearing support 24 that is secured to the housing 18. The shaft is also intermediately rotatably supported by at least one bearing 26 also retained in position by a bearing race 28 secured to the housing 18. Each bearing may be comprised of one or more ball bearings or taper bearings fitted into a bearing race.

The shaft 12 extends from the housing 18 of the rotor system 14 and is connected by a coupling 30 to a drive shaft 32 extending from motor 34. With the arrangement, rotation of the drive shaft 32 is transmitted to the coupling 30 to rotate the shaft 12 mounted in the bearings 24 and 26 to in turn rotate the rotor 16. Accordingly, the driven shaft 12 can be connected to any type of machinery that is to be rotatably driven.

Now referring in greater detail to FIG. 2, there is illustrated a displacement rack generally designated by the numeral 36 mounted on the race 28 of the bearing or housing 18 closely adjacent to the shaft 12 and electrically connected by a conductor 38 to a controller 40. The displacement rake 36 includes a bracket 42 having a base portion 44 suitably secured to the bearing race 28 or housing 18. Base portion 44 can be removably attached as by a magnet or permanently attached to the bearing race 28 or housing 18. Extending outwardly from the base portion 44 and in spaced parallel relation to the shaft 12 is arm portion 46. The arm portion 46 includes a plurality of through bores 48 that are spaced at selected intervals along the length of the arm portion 46 from the base portion 44 to the opposite end of the arm portion 46. A plurality of sensors 50–56 extend through the bores 48 for support by the bracket 42 close to but spaced from the surface of the rotating shaft 12. The sensors 50–56 are conventional in design and may be selected from various types that are commercially available, such as eddy-current, photo-optic, capacitance, inductance and the like. Because the sensors are conventional, the design and operation thereof will not be discussed in detail herein. Each of the sensors 50–56 includes a probe 58 with an end 60 mounted on a conductive plate 62 electrically connected to the conductor 38 that extends to the controller 40.

As shown in FIG. 2, the base portion 44 of bracket 42 is mounted on the end surface of the housing 18 and is therefore displaced from connection to either the bearing 26 or the shaft 12. In this manner, the sensors 50–56 and the supports therefore do not contact the rotating shaft 12 or require modification to the bearing.

The transducer system 10 cán be positioned to detect dynamic displacement of the shaft 12 without disrupting operation of the rotor system 14. The surface of the housing 18 which receives the bracket base portion 44 defines a reference plane 64 where the axis of each of the sensors 50–56 is located at a preselected distance X from the plane 64 which is aligned with the outboard surface of bearing 26. Thus with this arrangement, the X distance of each sensor 50 from the surface of the bearing 26 is different. The X distance for sensor 50 is a, for 52 is b, for 54 is c, and for 56 is d. The distances a, b, c and d can be varied and preferably distance d is selected to be as small as possible.

With the arrangement shown in FIG. 2, the displacement rake 36 is positioned to support the sensors 50–56 so that each of the probes 58 is aligned for purposes of illustration with an axis to provide a reading of a vertical bearing force component exerted on the shaft 12. After the measurements are taken in this direction, the displacement rake 36 is rotated 90° clockwise or counterclockwise to obtain a reading of the horizontal bearing force components. The vertical and horizontal bearing force components are then combined to give a reading of the total dynamic bearing force exerted on the shaft 12. By utilizing two displacement rakes 36 supporting sensors 50–56 angularly spaced 90° apart, the vertical and horizontal bearing force components can be simultaneously measured to provide a resultant readout by the controller 40.

Preferably the controller 40 is a microprocessor which is operable to actuate the sensors 50–56 and convert the signals received therefrom into a digital readout of the measurement of the dynamic bearing force exerted on the shaft at a time interval consistent with the frequency sampling rate of the lateral displacement of the shaft 12 being detected.

The controller 40 should be comprised of a processing unit such as the Mostek Z80 CPU and both erasable and programmed memory. Intel part IP2716, a 16k (2k ×8) UV eraseable PROM, and Intel part IP5101L-1, an Intel 256×4 bit static CMOS RAM, can be used for the memory. Preferably signal conditioning means are utilized such as analog to digital and digital to analog converters, filters and amplifiers where appropriate. Also the controller 40 may include LCD display 43.

In operation the controller 40 actuates the displacement probes or sensors 50-56. The probe 58 of each sensor is preferably maintained at exactly the same distance from the surface of the shaft 12. Any displacement of the shaft 12 from its initial position is detected by the sensors at the distance X from the reference plane 64 of the bearing 26. Each sensor 50-56 transmits an electrical signal through the conductor 38 to the controller 40. This transmitted signal is proportional to the dynamic displacement of the shaft 12 at each location X of the probes 58.

The controller 40 upon receipt of the respective signals combines the lateral displacement associated with each probe 58 located at the respective distances a, b, c and d from the reference plane 64 together with the geometry of the shaft 12 and the elastic modulus of the shaft 12 to determine the shear force in the shaft at position d. This provides a measure of the dynamic bearing force at a time interval consistent with the frequency sampling rate.

The dynamic bearing force is calculated as follows:

$$V(t) = EI \frac{d^3y}{dx^3} (x = d,t) \bigg|_{VERTICAL}$$

where:
V(t)=dynamic bearing component in vertical direction as a function of time, t
E=elastic modulus of the shaft
I=cross-section area moment of inertia of the shaft $\frac{d^3y}{dx^3} (x = d,t) \bigg|_{VERTICAL}$ = third derivative of the vertical shaft displacement with respect to the distance x as evaluated numerically at point d at time t.

The position of the probes 58 in FIG. 2 provides the vertical bearing force component. Accordingly to obtain the horizontal bearing force component the displacement rake 36 is rotated 90 clockwise or counterclockwise. This can be accomplished by utilizing the same bearing rake 36 used to measure the vertical bearing force component or a second displacement rake 36 may be positioned to obtain this measurement simultaneously with the vertical bearing force component. The horizontal bearing force component is calculated as follows:

$$H(t) = EI \frac{d^3z(x = d,t)}{dx^3} \bigg|_{HORIZONTAL}$$

$\frac{d^3z}{dx^3} (x = d,t) \bigg|_{HORIZONTAL}$ = third derivative of the horizontal shaft displacement with respect to the distance x as evaluated numerically at point d at time t.

The microprocessor controller 40 is operable to combine both the vertical and horizontal force components to give a readout of the total or resultant dynamic bearing force as represented as follows:

$$\text{Bearing Force} = \sqrt{H^2(t) + V^2(t)}$$

Both of the above components can be simultaneously measured by using two displacement rakes oriented 90° apart.

Further in accordance with the present invention, the displacement measurements for horizontal and vertical bearing moment components are calculated from the following:

$$M_V(t) = EI \frac{d^2y}{dx^2} (x = d,t) \bigg|_{VERTICAL}$$

$$M_H(t) = EI \frac{d^2z}{dx^2} (x = d,t) \bigg|_{HORIZONTAL}$$

The above components are calculated by the microprocessor controller 40 to provide an instantaneous readout with no additional information required to be transmitted to the controller 40.

Further in accordance with the present invention, the total bearing force and bearing moments are measurable on either side of the bearings 22 and 26 without disrupting operation of the rotor system 12 or altering the structure of either bearing to receive the displacement rake 36. The only requirement is that a portion of the rotating shaft 12 be accessible to accommodate the displacement rake 36. Thus, in accordance with the present invention, simultaneous measurements can be taken to provide a readout of both total bearing force and total bearing moment exerted on the shaft 12 on either side of the selected bearing 22 and 26 by utilizing an arrangement of two displacement rakes 36 angularly oriented at 90° apart with each rake supporting a minimum of four sensors which provide four data points. Only three data points and thus three sensors are needed if it is desired to determine only the bearing moment. It may also be possible to estimate some of the data points and then be able to use fewer sensors.

The controller 40 can be provided with sufficient memory to store readings taken by the sensors over time. By comparing this data one could determine if the displacement of the shaft and associated forces on the bearing have changed which may indicate bearing wear and potential bearing failure. Knowing that information one could take appropriate action to replace the bearing or adjust the machinery before failure occurs. One may also wish to provide the controller 40 with data transfer ports 45, wiring or modem connections to enable data collected by the sensors to be transferred to external memory and computers for storage analysis.

Controller 40 may also contain a program which will activate an alarm or light 41 when the electrical signals received from the sensors indicate that the shaft displacement is unacceptable and bearing failure is imminent.

For ease of illustration the rake 36 has been described and shown as being in a vertical or horizontal overlying relationship to the shaft. However, it should be distinctly understood that the rake may be in any plane passing through the shaft. The second data component is determined by rotating the rake 90° from the position of the rake when the first data component was determined.

According to the provisions of the patent statutes, I have explained the principle, preferred construction and mode of operation of my invention and have illustrated and described what I now consider to represent its best embodiments. However, it should be understood, that within the scope of the appended claims, the invention may be practiced otherwise than as specifically illustrated and described.

I claim:

1. Apparatus for measuring at least one of the dynamic force and dynamic moment exerted by a rotated shaft on a bearing comprising,
    a support member adapted to extend outwardly from the bearing in overlying relation with the shaft,
    a plurality of sensors for detecting displacement of the shaft relative to the sensor and generating a electrical signal proportional to the displacement
    said sensors located adjacent one another on said support member, each sensor positioned a preselected distance from the bearing and spaced from the shaft
    control means electrically connected to each of said sensors for receiving from each sensor an electric signal proportional to the shaft dynamic displacement at the location of each sensor from the bearing, and
    said control means upon actuation operable to receive a displacement signal from each sensor and combine the displacement signals to generate a readout of at least one of the dynamic force and the dynamic moment applied by the shaft to the bearing.

2. The apparatus of claim 1 wherein each sensor is spaced an identical distance from the shaft.

3. The apparatus of claim 1 wherein the bearing contains a bearing race around at least one of a roller bearing and a ball bearing and said bearing race forming a reference plane for receiving the support member.

4. The apparatus of claim 3 also comprising magnet means attached to the support member and adapted to attach the support member to the bearing race.

5. The apparatus of claim 1 wherein all distances between adjacent sensors are the same.

6. The apparatus of claim 1 wherein the controller includes a microprocessor having sufficient memory to store data generated by the sensors.

7. The apparatus of claim 1 also comprising a data transfer port attached to the controller for transmitting data generated by the sensors.

8. The apparatus of claim 1 wherein the controller contains a program which will activate an alarm when predetermined kinds of electrical signals are received from the sensors.

9. A bearing force and bearing moment transducer system comprising,
    a rotating shaft having a longitudinal axis,
    a bearing for rotatably supporting said shaft,
    means for supporting said bearing in a plane relative to said shaft,
    a first support arm extending outwardly from the plane of said bearing and spaced a fixed distance from the surface said shaft,
    a second support arm extending outwardly from the plane of said bearing and spaced a fixed distance from the surface of said shaft,
    said first and second support arms being angularly displaced with respect to the axis of said shaft,
    a plurality of displacement probes mounted on each support arm and spaced one from anther parallel to the longitudinal axis of the shaft and each probe positioned a selected distance from the plane of said bearing,
    said probes each having a sensor spaced a selected distance from said shaft where the distance between said sensor and said shaft is identical for each of said probes,
    each of said sensors being operable to sense lateral displacement of said shaft to generate an electrical signal proportional to the shaft dynamic displacement,
    a controller for receiving said electrical signals from said probes at the location of each probe on said first and second support arms, and
    means for electrically connecting each of said probes to said controller to combine the signals from said probes on said first and second support arms and generate from said controller a measurement of the at least one of dynamic force and the dynamic moment exerted by said shaft on said bearing.

10. A method for measuring the magnitude of at least one of the dynamic force and the dynamic moment exerted by a rotating member on a bearing comprising the steps of,
    supporting relative to the shaft a plurality of detectors spaced laterally from one another at preselected distances from the plane of the bearing,
    actuating each detector to generate a signal proportional to the displacement of the shaft sensed by the detector with respect to the location of each detector, and
    converting the signals received at the location of each detector to a measurement of at least one of the dynamic force and the dynamic moment exerted by the shaft on the bearing at the plane of the bearing at a preselected time interval.

* * * * *